United States Patent
Mahan et al.

(10) Patent No.: US 8,028,227 B1
(45) Date of Patent: Sep. 27, 2011

(54) METHOD, APPARATUS, PROCESSOR-READABLE MEDIA AND SIGNALS FOR ACQUIRING AND PRESENTING ACQUIRED MULTIMEDIA CONTENT

(75) Inventors: Laura L. Mahan, Kanata (CA); Kelly K. Forbes, Nepean (CA); Shaun Illingworth, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 0 days.

(21) Appl. No.: 09/540,756

(22) Filed: Mar. 31, 2000

(51) Int. Cl.
*G06F 17/00* (2006.01)

(52) U.S. Cl. ......... 715/202; 715/201; 715/205; 715/234

(58) Field of Classification Search ............... 715/500.1, 715/501.1, 200, 201, 202, 205, 234, 240
See application file for complete search history.

(56) References Cited

U.S. PATENT DOCUMENTS

| | | | | |
|---|---|---|---|---|
| 4,931,950 A * | 6/1990 | Isle et al. | ......................... | 706/11 |
| 5,208,745 A * | 5/1993 | Quentin et al. | ................. | 700/83 |
| 5,473,744 A * | 12/1995 | Allen et al. | ................. | 715/500.1 |
| 5,630,104 A * | 5/1997 | Ottesen et al. | .................. | 703/24 |
| 5,659,793 A * | 8/1997 | Escobar et al. | ............ | 715/500.1 |
| 5,752,029 A * | 5/1998 | Wissner | ...................... | 707/104.1 |
| 5,781,186 A * | 7/1998 | Jennings | .................... | 715/500.1 |
| 5,826,102 A * | 10/1998 | Escobar et al. | ............ | 715/500.1 |
| 5,848,291 A * | 12/1998 | Milne et al. | ................ | 715/500.1 |
| 5,892,507 A * | 4/1999 | Moorby et al. | ............ | 715/500.1 |
| 5,969,716 A * | 10/1999 | Davis et al. | .................... | 345/726 |
| 6,081,262 A * | 6/2000 | Gill et al. | .................... | 715/500.1 |
| 6,100,881 A * | 8/2000 | Gibbons et al. | ............ | 715/500.1 |
| 6,128,655 A * | 10/2000 | Fields et al. | ................... | 709/219 |
| 6,204,840 B1 * | 3/2001 | Petelycky et al. | ........... | 715/500.1 |
| 6,243,087 B1 * | 6/2001 | Davis et al. | .................... | 345/723 |
| 6,414,686 B1 * | 7/2002 | Protheroe et al. | .............. | 345/474 |
| 6,415,303 B1 * | 7/2002 | Meier et al. | ................. | 715/500.1 |
| 6,421,692 B1 * | 7/2002 | Milne et al. | ................. | 715/500.1 |
| 6,460,040 B1 * | 10/2002 | Burns | .............................. | 707/10 |
| 6,484,189 B1 * | 11/2002 | Gerlach et al. | ................. | 715/730 |
| 6,538,665 B2 * | 3/2003 | Crow et al. | ..................... | 715/723 |
| 6,751,800 B1 * | 6/2004 | Fukuda et al. | ................... | 725/40 |
| 6,766,357 B1 * | 7/2004 | Fandozzi | ....................... | 709/213 |
| 2002/0057287 A1 * | 5/2002 | Crow et al. | .................... | 345/716 |

* cited by examiner

*Primary Examiner* — Stephen Hong
*Assistant Examiner* — Gregory J Vaughn
(74) *Attorney, Agent, or Firm* — Mintz, Levin, Cohn, Ferris, Glovsky & Popeo, P.C.

(57) ABSTRACT

The present invention provides a method, apparatus, processor-readable medium and signals for building a presentation by receiving user input identifying multimedia content to be included in a presentation and copying multimedia content identified by such user-input from a multimedia source to memory, for access by a presentation application. Copying may involve copying multimedia content from an application while the application is using the multimedia content. There is also provided a method, apparatus, processor-readable medium and signals for providing a presentation by identifying multimedia content previously identified by a user as to be included in the presentation and accessing and presenting at least some of the multimedia content previously identified by the user.

29 Claims, 5 Drawing Sheets

METHOD, APPARATUS, PROCESSOR-READABLE MEDIA AND SIGNALS FOR ACQUIRING AND PRESENTING ACQUIRED MULTIMEDIA CONTENT

FIELD OF THE INVENTION

This invention relates to methods, apparatus, processor-readable media and signals for producing multimedia presentations and more particularly to acquiring and presenting acquired multimedia content.

BACKGROUND OF THE INVENTION

With the advent of the internet, computer users have been given access to a vast quantity of information. Much of this information is provided to users as multimedia content such as sound, graphics, text, etc, in the form of Hypertext Markup Language (HTML) files, graphics files such as JPEG and/or GIF files, or PDF files, for example. These types of files are typically received at a users computer through a browser running at the computer.

A browser, such as provided by Netscape facilitates access to content on the world wide web and even provides a history of websites visited, at which content may be found. The history usually lists URLs of websites visited, but is not necessarily a list of websites of interest to a user, since a user must typically surf through a plurality of websites to reach one of interest.

Bookmarks provide a way in which a user can identify URLs of websites of interest, however, no content is stored in association with bookmarks, other than that stored in cache. Furthermore, bookmarks are cumulative in that they generally do not specify websites of interest during an Internet session, but rather specify websites of interest from all sessions conducted by a user. Also, bookmarks specify web resources at which content may be found and require that the user be on-line in order to access the content specified by the bookmark.

Cache memory is used by browsers to store content of all websites visited over a period of time, to facilitate fast re-access of website content, when surfing forward and back through a plurality of websites. Thus, a plurality of desired and undesired multimedia content may be stored in cache memory, with no indications as to which is desired and which is undesired. Cache memory is usually loaded with content which is rarely, if ever accessed again by a user. Consequently, content stored in cache memory is typically discarded after some preset period of time to prevent the amount of memory devoted to caching from growing excessively. Thus content to be stored in cache memory is generally not selectable as being desirable or undesirable by a user and is variable in time. Content can, however, be saved manually as source or text, however, this creates individual, non-linked files with no specified order of retrieval, which makes it difficult to recall files for use in a presentation.

Thus, neither history, bookmarks, cache memory, nor manual saving used by a browser facilitate easy storage of content specifically selected by a user as being desirable for later retrieval as a presentation. What would be desirable is a simple way for a user to identify and store multimedia content such as may be obtained from the world wide web, for later retrieval in which only the content identified as being desirable by the user is presented, and is presented in an order specified by the user. If such retrieval could occur offline, it could be used in a presentation, for example.

SUMMARY OF THE INVENTION

The present invention addresses the above need by providing a method and apparatus and processor-readable medium and signals for building a presentation by receiving user input identifying multimedia content to be included in the presentation and copying multimedia content identified by user-input, from a multimedia source to memory, for access by a presentation application. This facilitates the creation of a permanent presentation folder or presentation file of multimedia content and an index of acquired content, while surfing the world wide web.

In one embodiment the method and apparatus, medium and signals facilitate copying multimedia content from an application while such application is using the multimedia content. The method and apparatus may facilitate using a multimedia content application such as a browser to access multimedia content and to make such multimedia content selectable by a user for copying to a presentation file while concurrently running the multimedia content application.

In one embodiment the method and apparatus, medium and signals involve associating an identifier such as a uniform resource locator with stored multimedia content, for access by the presentation application. Such uniform resource locator may be identified by an application such as a browser through which the multimedia content is received.

In one embodiment the method and apparatus, medium and signals facilitate associating user-definable notes with desired multimedia content, for use by the presentation application.

To organize captured multimedia content, the method and apparatus, codes and signals may involve producing a multimedia content record accessible by the presentation application, the multimedia content record including a link to the multimedia content in memory.

In accordance with another aspect of the invention, there is provided a method, apparatus, processor-readable medium and signals for providing a presentation by identifying multimedia content previously identified by a user as to be included in the presentation and by accessing and presenting at least some multimedia content previously identified by the user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
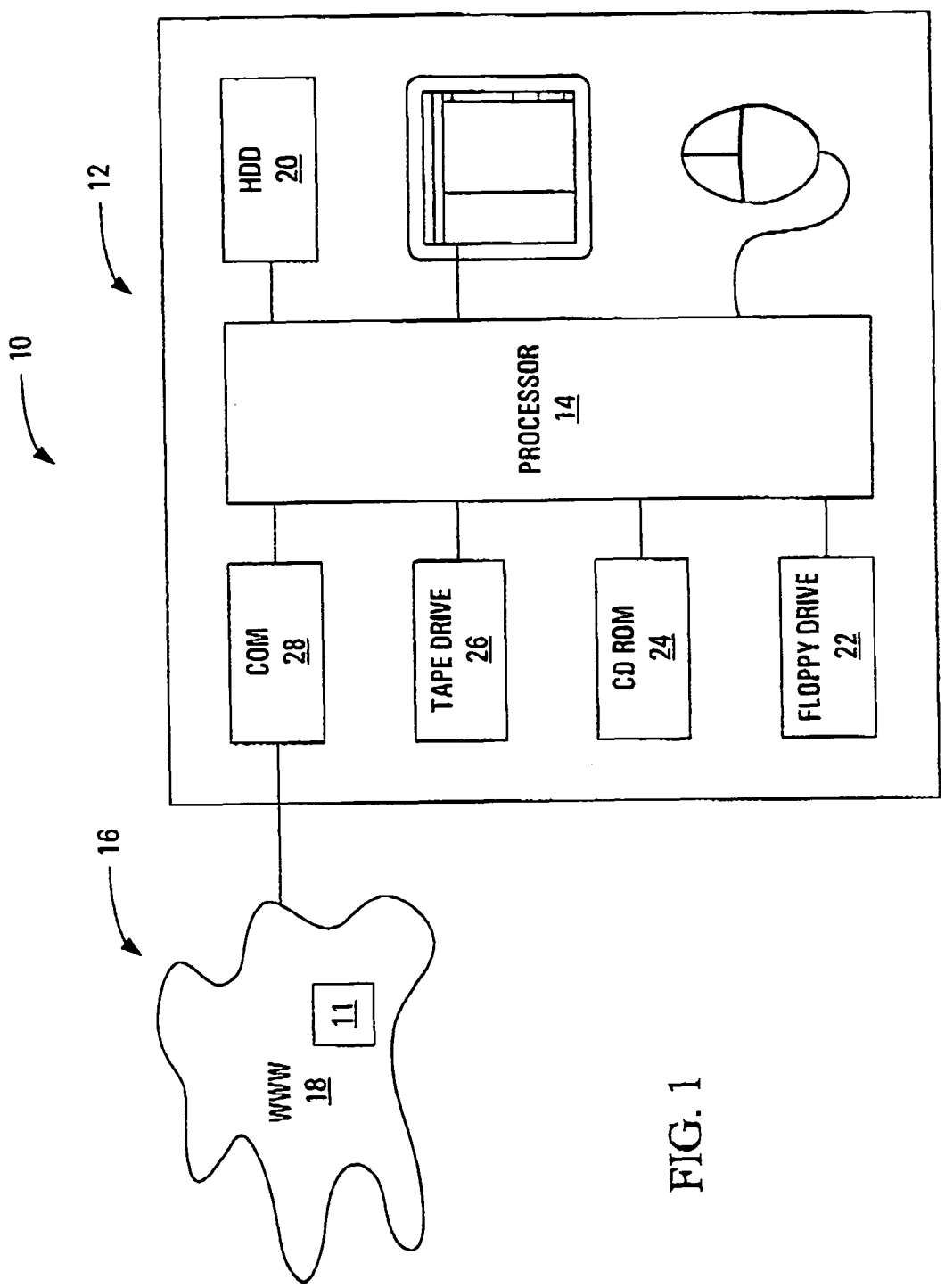
FIG. 1 is a block diagram of an apparatus for acquiring multimedia content according to a first embodiment of the invention.

As shown in FIG. 1, an apparatus for acquiring multimedia content according to a first embodiment of the invention is shown generally at 10. The apparatus includes a computer 12 having a processor 14 in communication with a network 16, such as the world wide web 18. The computer includes memory media such as a hard disk drive 20, which is accessible by the processor 14 and which may be programmed with browser program codes operable to direct the processor 14 to run a browser having a graphical user interface such as browser window 54 shown in FIG. 5 for browsing resources identified by uniform resource locators (URLs) on the world wide web. Referring back to FIG. 1, the processor 14 is further programmed with codes according to one embodiment of the invention, which direct the processor 14 to receive user input identifying multimedia content to be included in a presentation and to copy multimedia content identified by such user-input, from a source to memory, for access by a presentation application. The multimedia content identified and copied to memory preferably includes content viewed in a window of the browser. Thus, the user can use the browser to surf the world wide web to locations of interest and when such a location is addressed, the user can specify that it is desired to copy the multimedia content of the currently addressed location or content associated with the currently addressed location to a presentation storage area in memory, for later retrieval by a presentation application.

The specific way in which this is achieved may be accomplished by providing computer readable instructions to the processor 14 through any of various media such as a floppy disk 22, a CD-ROM 24, a tape drive 26, a communications interface 28 or any other method by which computer readable codes may be made to direct the processor 14 to execute instructions. Preferably, such instructions are provided to the processor in the form of a web-based applet shown generally at 11 in FIG. 2, that users can access and download from a website, through conventional hard-wired communications services or through wireless communications services, where the applet may be encoded in signal segments of a signal embodied in a carrier-wave, for example. The applet may be an Active-x™ or Javabeans™ plugin to a web browser, for example, and may be used with any web browser at any web location.

Figure 3:
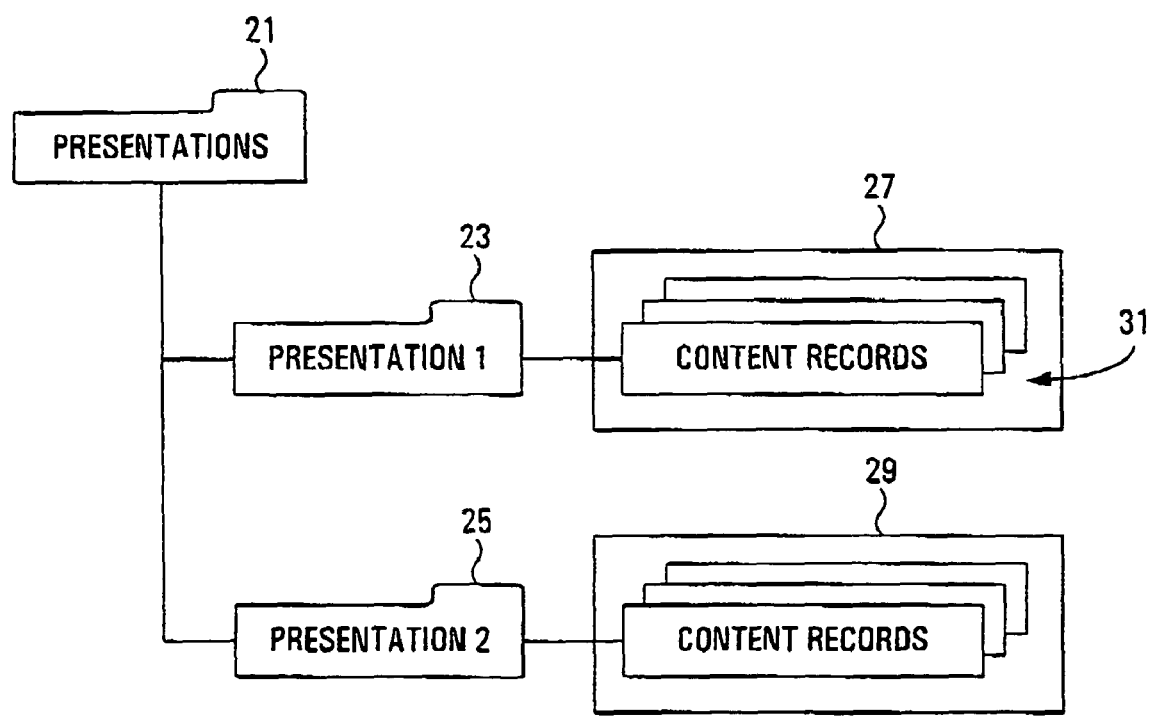
FIG. 3 is a schematic diagram of a folder structure produced by codes, in accordance with the first embodiment of the invention including a content folder.

Referring to FIG. 1, the applet 11 may be received from the world wide web 18, through the communications interface 28, and stored by the processor 14 in the hard disk drive 20. The user may be given the option to load the applet, in which case the applet 11 registers itself with the browser, in a conventional manner and as shown in FIG. 3, sets up a presentations folder 21, having presentation subfolders 23, 25, etc., each of which may be used to store multimedia content and a respective presentation file 27 and 29 in which a plurality multimedia content records 31 may be stored.

Figure 2:
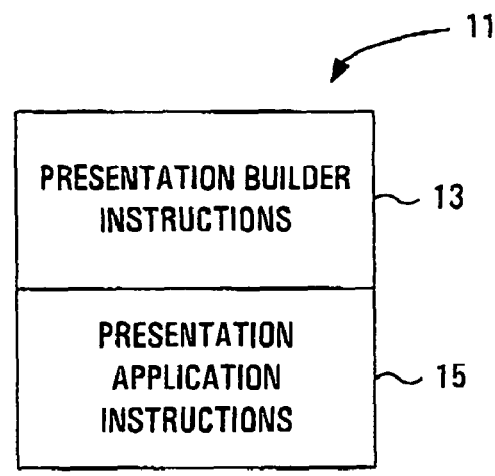
FIG. 2 is a schematic representation of an applet according to a first embodiment of the invention.

Referring to FIG. 2, the applet 11 preferably includes a first block of codes 13 for providing processor-readable presentation builder instructions for directing the processor to receive user input identifying multimedia content to be included in a presentation and to copy multimedia content identified by such user input from a source to memory for access by a presentation application. The applet 11 preferably further includes a second block of codes 15 for providing processor-readable presentation application instructions for directing the processor to provide a presentation by identifying multimedia content previously identified by a user as to be included in a presentation and by accessing and presenting at least some of the multimedia content previously identified by a user.

Figure 4:
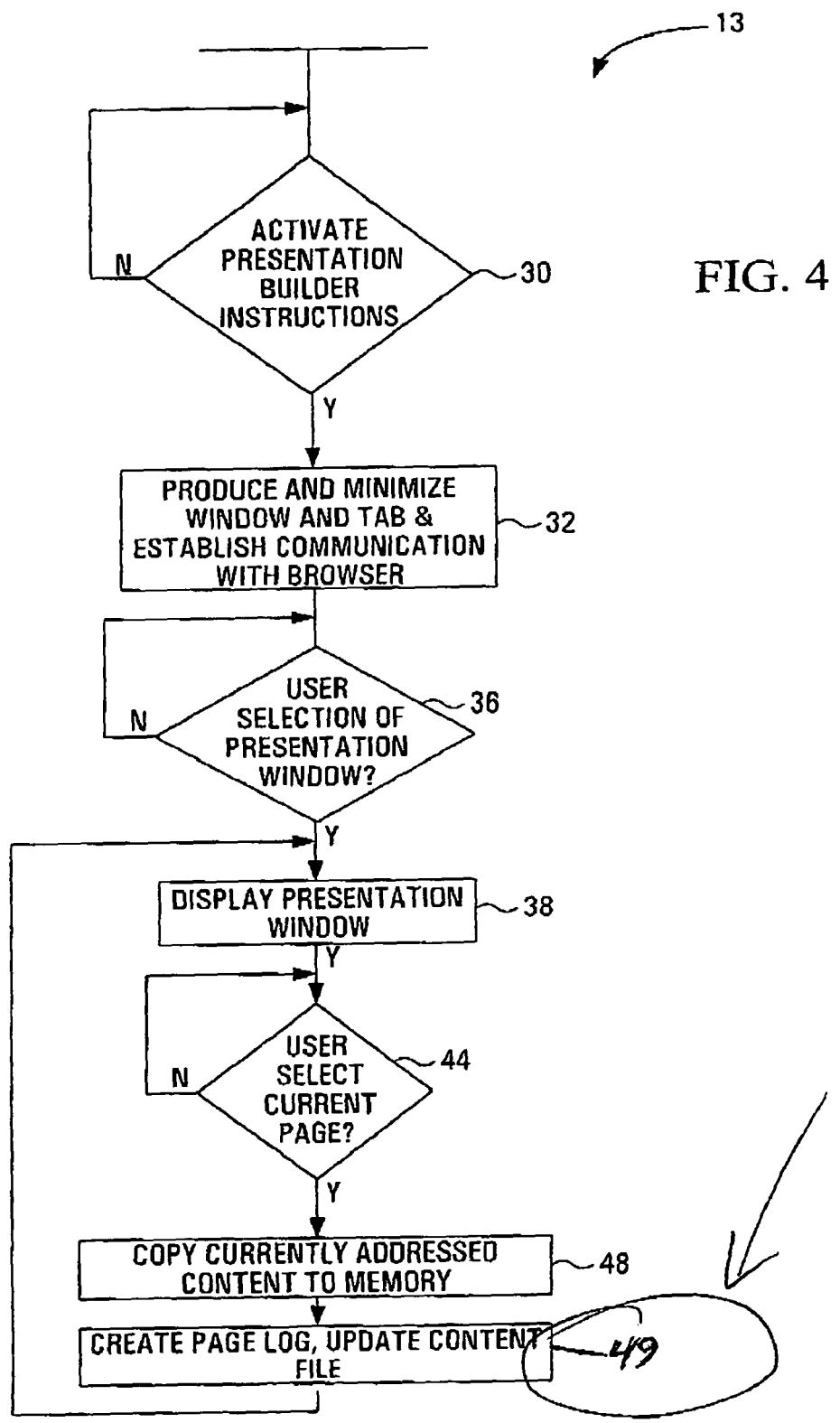
FIG. 4 is a flow chart representing blocks of code for carrying out a method of acquiring multimedia content according to the first embodiment of the invention.

Referring to FIG. 4, the core functionality of the presentation builder instructions 13 may include a first block of codes 30 which directs the processor to detect user activation of the presentation builder instructions 13. To effect such activation, these instructions may be accessed through an icon, for example, placed on a toolbar of the browser, or desktop, for example.

Figure 5:
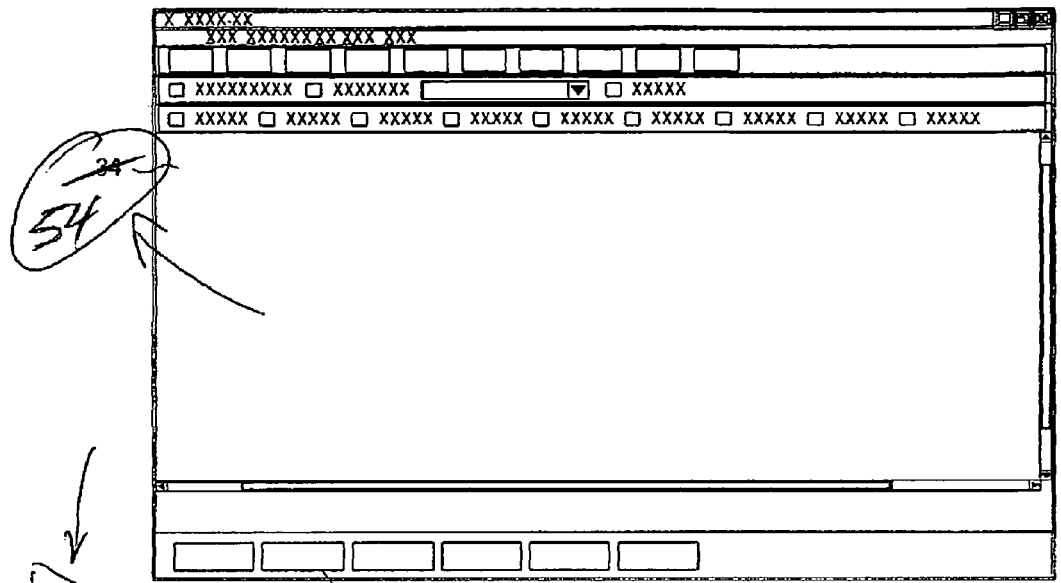
FIG. 5 is a schematic representation of a browser window in which a concurrent window produced by codes according to the first embodiment of the invention is produced.

Still referring to FIG. 4, the presentation builder instructions 13 may further include a block of codes 32 which directs the processor to create and minimize a concurrent presentation window, which produces a tab 41 on a tab bar of the users graphical user interface, as shown in FIG. 5, and which establishes communications with the users browser to receive a URL currently addressed by the browser.

Figure 6:
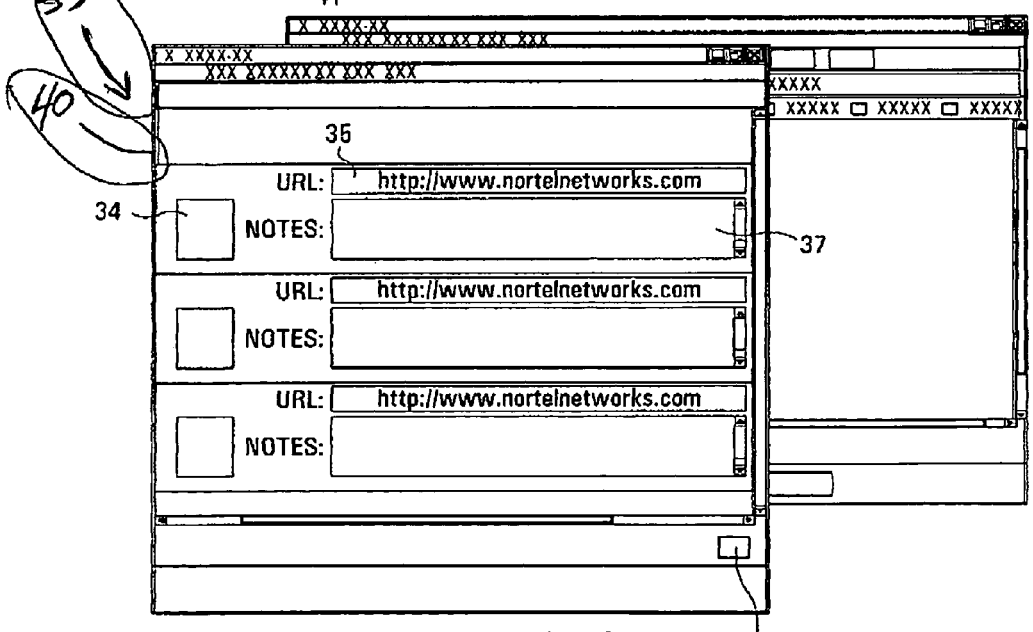
FIG. 6 is a schematic representation of a presentation window according to the first embodiment of the invention.

Referring back to FIG. 4, the presentation builder instructions 13 include a further block of codes 36 which directs the processor to detect user selection of the presentation window. This may be done by the user operating a user input device such as a mouse, to the tab 41 shown in FIG. 5 and activating the presentation window to produce a display as shown generally at 33 in FIG. 6. Referring to FIGS. 4, 5 and 6, upon selection of the presentation window tab 41, block 38 directs the processor to display in a presentation window 40 a preview window 34 displaying the page currently addressed by the browser, while simultaneously displaying a page identification such as a URL of the page, as indicated at 35, and while simultaneously displaying a text box 37 for receiving user-inputted text, such as user-definable notes, and associating same with the multimedia content shown in the preview window. A plurality of preview windows of the type shown at 34 may be displayed to show previously acquired content, for example.

Referring back to FIG. 4, the presentation builder instructions 13 further include a user selection portion which determines whether a user has selected particular multimedia content to be included in the presentation. In this embodiment, this portion includes a block 44 which detects user activation of a save button 39 on the presentation window 40 shown in FIG. 6 to cause the page currently addressed by the browser to be added to the presentation file.

After activation of the save button 39, block 48 directs the processor to copy the currently selected multimedia content into the presentation subfolder 23 in memory, such as the hard disk drive 20 shown in FIG. 1, while the browser is displaying or using the same multimedia content. Then block 49 directs the processor to create a page log, and update the content file.

Figure 7:
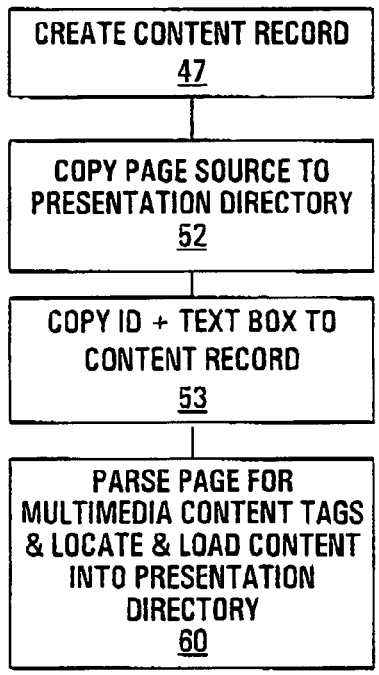
FIG. 7 is a flow chart of a copy function executed by codes according to the first embodiment of the invention.
Figure 8:
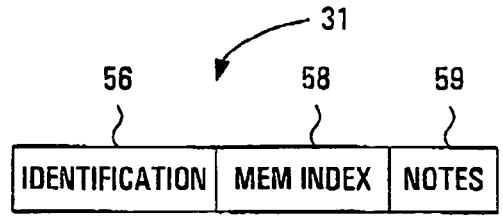
FIG. 8 is a schematic representation of a content record of the content folder shown in FIG. 3.

Referring to FIGS. 3 and 7, to effect such copying, the presentation builder instructions 13 include a first block of codes 47 which causes the processor to create a content record 31 in the presentation file 27, the content record 31 having a format as shown in FIG. 8. This format includes an ID field 56, a memory index field 58, and a notes field 59. Referring back to FIG. 7, block 52 then directs the processor to copy the multimedia content addressed by the browser into the presentation subfolder and to store a memory index to the content, in the memory index field 58 of the content record 31. Block 53 then directs the processor to load the ID field 56 with the URL from which the multimedia content was just copied (as identified by the browser) and to load the notes field 59 with the contents of the text box 37 shown in FIG. 6.

It will be appreciated that any given HTML page may include a plurality of multimedia content and in this regard such content may include images, for example. Consequently, referring back to FIG. 7, the applet includes a block 60 which directs the processor to parse the HTML page for <img> tags and to load the content from URLs associated with such <img> tags into the presentation folder.

Alternatively, or in addition, the HTML page source may be parsed for <aiff> and/or <way> tags to load content from URLs associated with these or other sound content tags.

In general, on locating a multimedia tag, the processor retrieves the associated multimedia source code, which may be text, a graphics image or sound file, for example, from the URL specified by the multimedia tag and stores the multimedia content identified thereby in the same folder as the HTML page from which it was addressed, in the presentation file 27.

Or if the current viewed content is in the form of a .pdf file, such .pdf file may be stored as a separate content file in the presentation subfolder 23, with a corresponding content record 31 in the presentation file 27.

Alternatively, multimedia source content of the type described above may be appended as a content segment to a single content file and identifications of specific content segments and corresponding indices thereto may be stored in the ID field 56 and the memory index field 58 respectively of a content record 31. The single presentation file may be produced in a format compatible with the POWERPOINT™ program available from Microsoft Corporation of Washington, USA, for example. Or, the single presentation file may be stored in an Adobe ACROBAT™ (.pdf) file format, for example.

In the above manner, a user can create a permanent presentation folder or presentation file of multimedia content and an index of acquired content, while surfing the world wide web. In other words, the user can use the browser to surf the world wide web to locations of interest and when such a location is addressed, the user can specify that it is desired to copy the multimedia content of the currently addressed location or content associated with the currently addressed location to a presentation storage area in memory, for later retrieval by a presentation application.

Referring back to FIG. 2, the presentation application instructions 15 may provide blocks of codes which direct the processor to identify multimedia content previously identified by a user as to be included in a presentation and to access and present at least some of the multimedia content previously identified by the user. The previously identified multimedia content is that which has been stored in the presentation folder.

Figure 9:
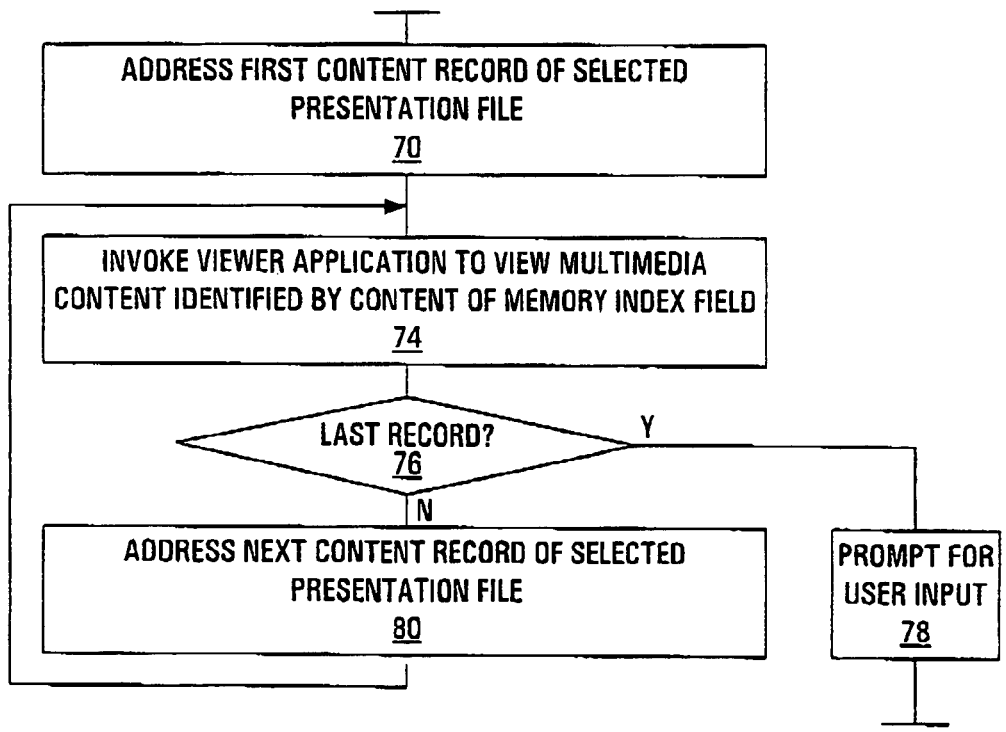
FIG. 9 is a flowchart of a presentation application, according to a second aspect of the invention.

In particular, referring to FIGS. 3 and 9, the presentation application instructions 15 may include a block of instructions 70 which direct the processor to read a selected presentation file 27 and address a first content record of the selected presentation file 27.

Block 14 then directs the processor to display the multimedia content addressed by the memory index field 58 shown in FIG. 8 of the first content record such as content record 31 shown in FIG. 3, for example. If the multimedia content is in a browser-compatible format, the browser is invoked to view the content. Or if the multimedia content is in a .pdf format, an Adobe ACROBAT Reader™ is invoked to view the content. Or if the multimedia content is stored in a format compatible with Microsoft POWERPOINT™, that program is invoked to view the content.

In FIG. 9, effectively block 74 directs the processor to provide to a viewing application, which may include a browser, a POWERPOINT™ program or a .pdf file reader, for example, multimedia content identified by the contents of the memory index field 58 associated with the currently addressed record shown in FIG. 8. In general, the viewing application displays the multimedia content or otherwise presents multimedia content addressed by the contents of the memory index field 58 to the user. Block 76 then directs the processor to determine whether the last record in the presentation file has been addressed, and if it has, block 78 directs the processor to prompt the user for input on what to do next. Otherwise, if the last record has not been addressed, block 80 directs the processor to address the next content record of the selected presentation file and to resume processing at block 74.

The act of addressing the next content record of the selected presentation file may be performed automatically, such as after a predetermined time, or on command of a user, in response to user input, for example. Using the automatic addressing method, a timer may be employed to display or otherwise provide to the user the multimedia content addressed by the contents of the memory index field 58 for a period of time, before presenting the multimedia content identified by the contents of the memory index field 58 of the next addressed content record. Thus, an automated presentation can be produced. Furthermore, since the contents of the memory index field 58 may always refer to a resource at the user's computer, there is no need to be in communication with the world wide web to view a presentation.

Alternatively, it will be appreciated that the contents of the memory index field may be used to address separate locations within a single multimedia content file to which multimedia content segments have been appended as described above. This may be the case, for example, where the viewing application is the POWERPOINT™ program provided by Microsoft. In this case, each multimedia content segment identified by a respective memory index field 58 may corresponding to a separate "slide" within a POWERPOINT™ presentation.

While specific embodiments of the invention have been described and illustrated, such embodiments should be considered illustrative of the invention only and not as limiting the invention as construed in accordance with the accompanying claims.

What is claimed is:

1. A method of building a presentation, the method comprising:
   using a multimedia content application, accessing a page containing multimedia content from a multimedia source, wherein the multimedia content includes at least one tag;
   automatically identifying multimedia content on the page by parsing the page using the at least one tag;
   displaying an identifier for the page containing the multimedia content, a window for previewing at least some of the identified multimedia content on the page, and a window for entry of user-definable notes associated with at least some of the identified multimedia content on the page;
   selecting by a user at least some of the multimedia content identified on the page while the page is being accessed or used by the multimedia content application; and using a presentation application, copying
   from the multimedia source, at least some of the multimedia content selected by the user based on the at least one tag,
   any user-definable notes entered by the user and associated with the at least some of the identified multimedia content on the page, and
   the identifier for the page containing the multimedia content into at least one presentation folder located in a memory;
wherein the presentation application is configured to use information stored in the at least one presentation folder to build the presentation.

2. The method claimed in claim 1 wherein copying comprises copying said multimedia content having said tag from said multimedia content application while said multimedia content application is using said multimedia content having said tag.

3. The method claimed in claim 1 further comprising associating an identifier with said multimedia content having said tag, for access by the presentation application.

4. The method claimed in claim 3 wherein associating an identifier comprises associating a uniform resource locator with said multimedia content having said tag.

5. The method claimed in claim 4 wherein associating an identifier comprises associating with said multimedia content having said tag a uniform resource locator identified by an application using said multimedia content having said tag.

6. The method claimed in claim 1 further comprising associating user-definable notes with said multimedia content having said tag, for use by the presentation application.

7. The method claimed in claim 1 further comprising producing a multimedia content record accessible by the presentation application, said multimedia content record including a link to said multimedia content having said tag in said memory.

8. The method claimed in claim 7 further comprising producing said multimedia content record such that it includes an identifier associated with said multimedia content having said tag, a memory index field corresponding to the multimedia content selected by the user, and a notes field corresponding to the user-definable notes associated with at least some of the identified multimedia content.

9. The method claimed in claim 1 further comprising displaying said multimedia content having said tag in a preview window in a presentation window.

10. The method claimed in claim 9 further comprising displaying in association with said preview window an identifier that is associated with said multimedia content having said tag.

11. The method claimed in claim 1 wherein said multimedia content application comprises a browser and wherein accessing said page comprises accessing a web page with said browser.

12. The method claimed in claim 1 wherein copying said multimedia content having said tag comprises copying multimedia content having a tag selected from the group of tags consisting of an image tag, an audio tag and a video tag.

13. A method of building a presentation, the method comprising repeating the method of claim 1 in respect of each of a plurality of pages having multimedia content to be included in said presentation.

14. The method of claim 13 further comprising storing, in a presentation file, an indication of an order in which said plurality of pages in said memory are to be accessed by said presentation application.

15. An apparatus for building a presentation, the apparatus comprising:
   at least one memory;
   at least one processor coupled to the at least one memory and configured to
      access a page containing multimedia content from a multimedia source, wherein the multimedia content includes at least one tag;
      automatically identify multimedia content on the page by parsing the page using the at least one tag;
      display an identifier for the page containing the multimedia content, a window for previewing at least some of the identified multimedia content on the page, and a window for entry of user-definable notes associated with at least some of the identified multimedia content on the page;
      select by a user at least some of the multimedia content identified on the page while the page is being accessed or used by the at least one processor; and
      copy
         from the multimedia source, at least some of the multimedia content selected by the user based on the at least one tag,
         any user-definable notes entered by the user and associated with the at least some of the identified multimedia content on the page, and
         the identifier for the page containing the multimedia content into at least one presentation folder located in a memory;
      wherein the presentation is configured to be built based on information stored in the at least one presentation folder.

16. The apparatus claimed in claim 15 wherein said at least one processor is configured to copy said multimedia content having said tag from said multimedia content application running on said at least one processor, while said multimedia content application is using said multimedia content having said tag.

17. The apparatus claimed in claim 15 wherein said at least one processor is configured to associate an identifier with said multimedia content having said tag, for access by the presentation application.

18. The apparatus claimed in claim 17 wherein said at least one processor is configured to associate a uniform resource locator with said multimedia content having said tag.

19. The apparatus claimed in claim 18 wherein said at least one processor is configured to associate with said multimedia content having said tag a uniform resource locator identified by an application using said multimedia content having said tag and running on said at least one processor.

20. The apparatus claimed in claim 15 wherein said at least one processor is configured to associate user-definable notes with said multimedia content having said tag, for use by the presentation application.

21. The apparatus claimed in claim 15 wherein said at least one processor is configured to produce a multimedia content record accessible by the presentation application, said multimedia content record including a link to said multimedia content having said tag in said memory.

22. The apparatus claimed in claim 21 wherein said at least one processor is configured to produce said multimedia content record such that it includes an identifier associated with said multimedia content having said tag, a memory field corresponding to the multimedia content selected by the user, and a notes field corresponding to the user-definable notes associated with at least some of the identified multimedia content.

23. The apparatus claimed in claim 15 wherein said at least one processor is configured to run said multimedia content application.

24. The apparatus claimed in claim 23 wherein said at least one processor is configured to use said multimedia content application to access multimedia content selectable by a user.

25. The apparatus claimed in claim 15 further comprising means for displaying said multimedia content having said tag in a preview window in a presentation window.

26. The apparatus claimed in claim 25 further comprising means for displaying in association with said preview window an identifier that is associated with said multimedia content having said tag.

27. A computer-readable medium for providing processor-readable instructions for building a presentation, the instructions comprising:
 using a multimedia content application, accessing a page containing multimedia content from a multimedia source, wherein the multimedia content includes at least one tag;
 automatically identifying multimedia content on the page by parsing the page using the at least one tag;
 displaying an identifier for the page containing the multimedia content, a window for previewing at least some of the identified multimedia content on the page, and a window for entry of user-definable notes associated with at least some of the identified multimedia content on the page;
 selecting by a user at least some of the multimedia content identified on the page while the page is being accessed or used by the multimedia content application; and
 using a presentation application, copying
  from the multimedia source, at least some of the multimedia content selected by the user based on the at least one tag,
  any user-definable notes entered by the user and associated with the at least some of the identified multimedia content on the page, and
  the identifier for the page containing the multimedia content into at least one presentation folder located in a memory;
 wherein the presentation application is configured to use information stored in the at least one presentation folder to build the presentation.

28. An apparatus for building a presentation, the apparatus comprising:
 means for accessing a page containing multimedia content from a multimedia source, wherein the multimedia content includes at least one tag;
 means for automatically identifying multimedia content on the page by parsing the page using the at least one tag;
 means for displaying a window for previewing at least some of the identified multimedia content on the page, a window for entry of user-definable notes associated with at least some of the identified multimedia content on the page, and an identifier for the page containing the multimedia content;
 means for selecting by a user at least some of the multimedia content identified on the page while the page is being accessed or used by the means for accessing;
 means for copying
  from the multimedia source, at least some of the multimedia content selected by the user based on the at least one tag,
  any user-definable notes entered by the user and associated with the at least some of the identified multimedia content on the page, and
  the identifier for the page containing the multimedia content into at least one presentation folder located in a memory;
 means for building the presentation configured to use information stored in the at least one presentation folder to build the presentation.

29. A method of building a presentation, the method comprising:
 using a browser, accessing a web page containing multimedia content from a multimedia source, wherein the multimedia content includes at least one multimedia tag;
 automatically identifying multimedia content on the web page by parsing the web page using the at least one multimedia tag;
 displaying an identifier for the web page containing the multimedia content, a presentation window for previewing at least some of the identified multimedia content on the web page, and a window for entry of user-definable notes associated with at least some of the identified multimedia content on the web page;
 selecting by a user at least some of the multimedia content identified on the web page while the web page is being accessed or used by the browser; and
 using a presentation application, copying
  from the multimedia source, at least some of the multimedia content selected by the user based on the at least one tag,
  any user-definable notes entered by the user and associated with the at least some of the identified multimedia content on the web page, and
  the universal resource locator for the web page containing the multimedia content into at least one presentation folder located in a memory;
 wherein the presentation application is configured to use information stored in the at least one presentation folder to build the presentation.

* * * * *